Oct. 13, 1953  J. W. RILEY  2,655,298
GUN CARRIAGE ATTACHMENT FOR VEHICLE DASH PANELS
Filed Oct. 12, 1950  3 Sheets-Sheet 1
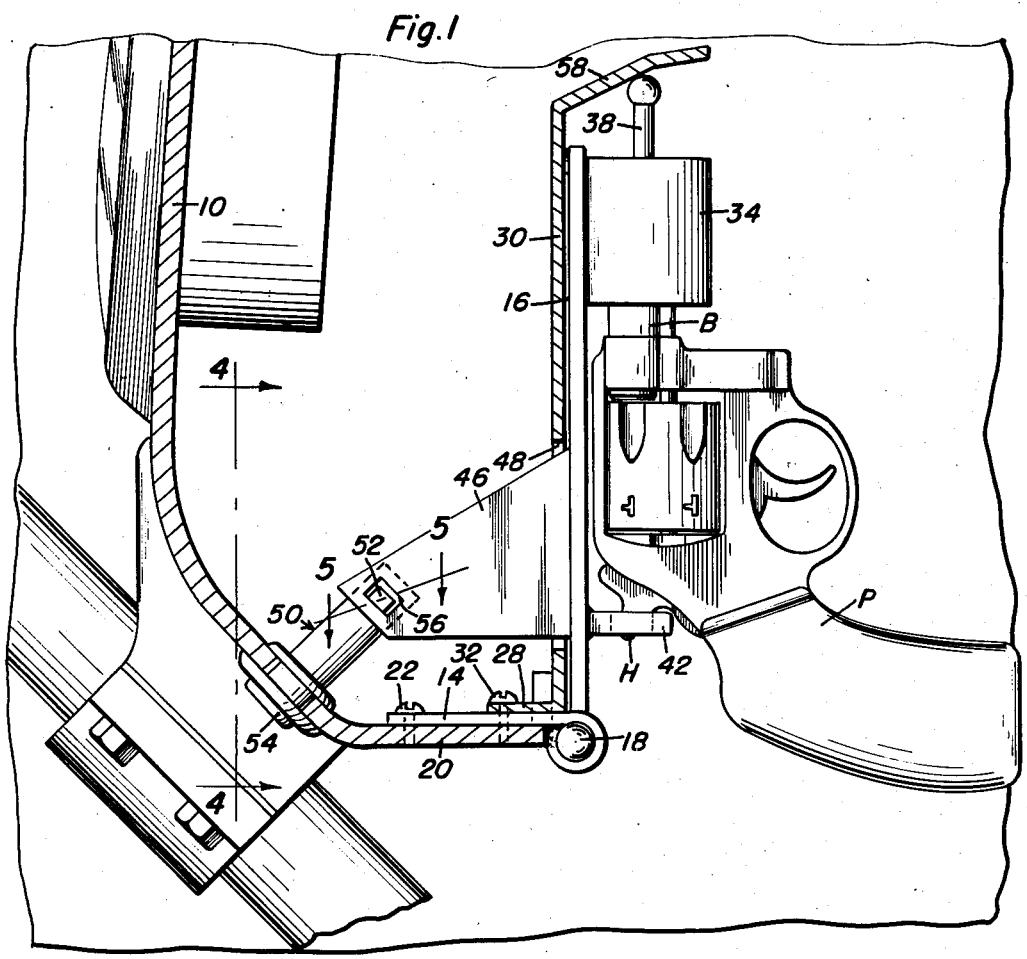
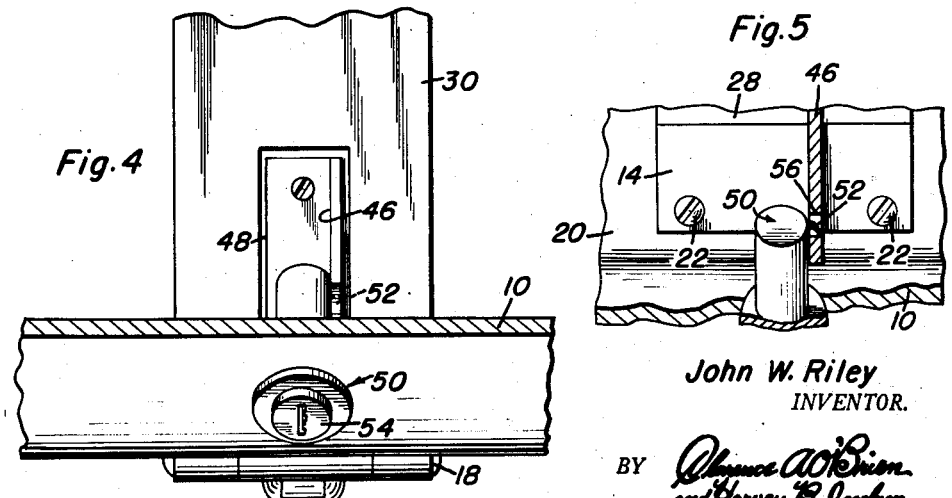
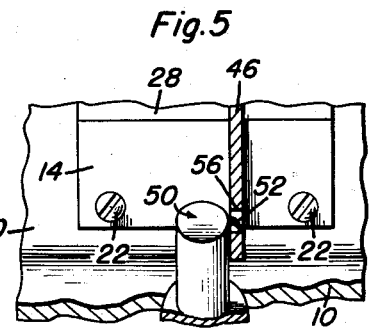
John W. Riley
INVENTOR.

Oct. 13, 1953   J. W. RILEY   2,655,298
GUN CARRIAGE ATTACHMENT FOR VEHICLE DASH PANELS
Filed Oct. 12, 1950   3 Sheets-Sheet 2
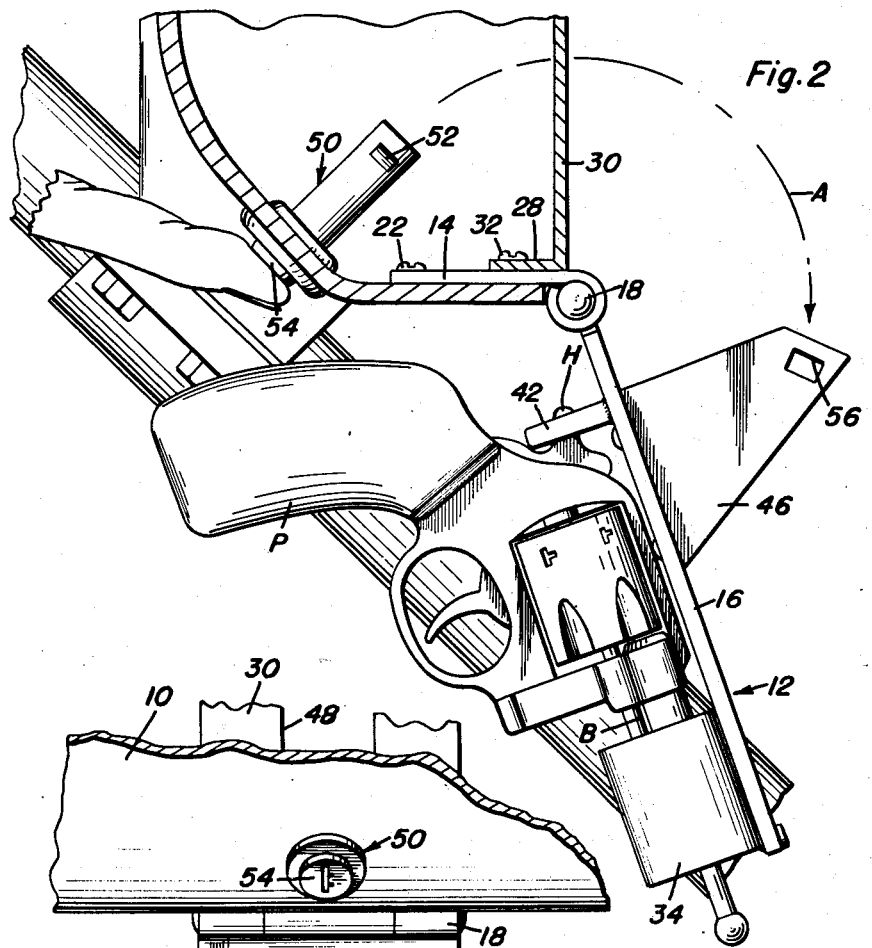
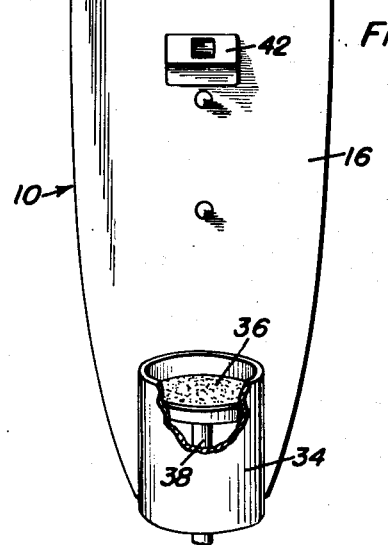
John W. Riley
INVENTOR.

Oct. 13, 1953 J. W. RILEY 2,655,298
GUN CARRIAGE ATTACHMENT FOR VEHICLE DASH PANELS
Filed Oct. 12, 1950 3 Sheets-Sheet 3
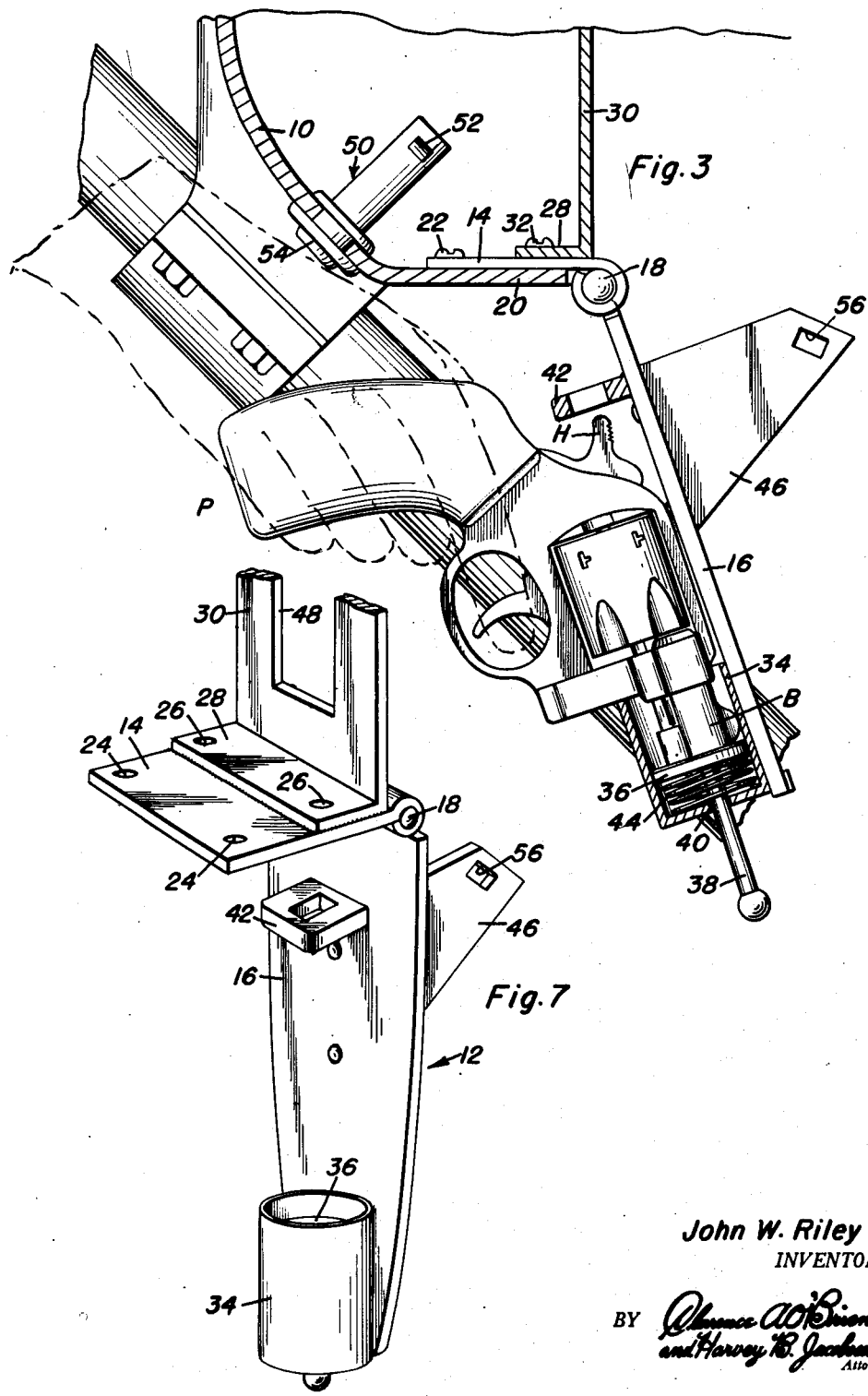
John W. Riley
INVENTOR.

Patented Oct. 13, 1953

2,655,298

UNITED STATES PATENT OFFICE 2,655,298

GUN CARRIAGE ATTACHMENT FOR VEHICLE DASH PANELS

John W. Riley, State College, N. Mex.

Application October 12, 1950, Serial No. 189,826

4 Claims. (Cl. 224—1)

1

This invention relates to new and useful improvements in gun carriages and the primary object of the present invention is to provide an attachment for vehicle dash panels for supporting a pistol concealed behind a dash panel and which is readily actuated to expose the pistol supported thereby.

Another important object of the present invention is to provide a gun carriage including a vertically swingable pistol support or holder that is quickly and readily mounted on a dash panel and a key operated locking mechanism mounted on the dash panel and engaging the support to lock the support raised behind the dash panel.

A further object of the present invention is to provide a gun carriage attachment for dash panels of vehicles that is quickly and readily applied to or removed from a dash panel in a convenient manner and which is so constructed as to receive various types of revolvers or pistols and permit rapid removal of a gun therefrom.

A still further aim of the present invention is to provide a gun carriage attachment for vehicle panels that is simple and practical in construction, strong and reliable in use, small and compact in structure, inexpensive to manufacture and install, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a vertical sectional view of a vehicle dash panel and showing the present invention mounted thereon and disposed behind the panel and supporting a pistol;

Figure 2 is a view similar to Figure 1 and showing the locking mechanism being released to permit the pistol support to swing downwardly below the dash panel;

Figure 3 is a view similar to Figures 1 and 2 but showing the pistol support in its fully lowered position and the pistol about to be removed from the support;

Figure 4 is a vertical sectional view taken substantially on the plane of section line 4—4 of Figure 1;

Figure 5 is a sectional view taken substantially on the plane of section line 5—5 of Figure 1;

Figure 6 is a front view of Figure 3, the pistol being removed and with parts of the barrel receiving sleeve broken away; and Figure 7 is a perspective view of the present

2 invention and with part of the mounting bracket broken away.

Referring now to the drawings in detail, wherein for the purpose of illustration, there is disclosed a preferred embodiment of the present invention, the numeral 10 represents a vehicle dash panel to which the present gun carriage is mounted. The carriage consists of a support 12 in the form of two hingedly connected sections or plate members 14 and 16 that are joined as at 18.

The plate member 14 overlies the inturned flange 20 of the dash panel 10 and is secured thereto by bolts 22 that extend through apertures 24 in the plate member 14 and which are threaded in apertures in the flange 20. The plate member 14 is formed with additional apertures that register with apertures 26 in the horizontal flanged portion 28 of a vertical mounting bracket 30. Bolts 32 extend through the apertures 26 and are threaded in holes in the flange 20, and the flange 28 is suitably fixed to the plate member 30 by welding or the like.

A sleeve or barrel seat 34 is suitably fixed to the plate member 16 and slidably receives a plunger 36, of soft, resilient material, which includes a shank 38 that is slidably received in an aperture 40 in the closed end of the sleeve 34. The open end of the sleeve 34 registers with a hammer seat or ear 42 that is rigidly secured to the same side of the plate member 16 as the sleeve 34. A coil spring 44 embraces the shank 38 and is biased between the plunger 36 and the closed end of the sleeve 34 to yieldingly urge the plunger toward the ear 42.

An arm 46 is rigidly secured to the plate member 16 and projects laterally from the plate member 16 and is located on the opposite side of the plate member 16 from the ear 42 and sleeve 34. The bracket 30 is provided with a vertical slot 48 that will receive the arm 46 when the plate member 16 is raised to its vertical position as shown best in Figures 1, 4 and 5.

A key operated locking mechanism 50, of the type frequently used on the glove compartment doors of passenger cars, is mounted on the dash panel 10 and includes a cam surfaced spring urged lug 52 that projects laterally through a transverse opening in the outer barrel of the member 50. The locking mechanism 50 also comprises a key operated barrel 54 which can be moved longitudinally after the proper key has been inserted therein in order to retract the lug 52.

The locking mechanism 50 and lug 52 are so located as to permit the arm 46 to ride against the lug 52 as the plate member 16 is raised and retract the lug 52 until an opening 56 in the arm 46 registers with the lug 52 whereupon the lug 52 will pass through the opening 56.

In practical use of the present invention, the barrel B of a pistol P is inserted in the sleeve 34 and the plunger 36 is depressed to permit the hammer H to fit in the aperture in ear 42 whereupon the spring 44 will yieldingly urge the hammer H against the ear 42.

The plate member 16 is then raised to its vertical position and the lug 52 will be in the opening 56. The mechanism 50 is locked by a proper key to hold the member 16 raised. The upper offset end 58 of the bracket 30 engages the plunger shank 38 to prevent unauthorized lifting of the shank 38 in order to remove the pistol.

In order to remove the pistol P, the proper key is placed in the barrel 54 and the mechanism 50 unlocked, whereupon a depression of the barrel 54, as shown in Figure 2, will cause the plate member 16 and the elements supported thereon to swing downwardly in the direction of arrow A in Figure 2.

Then, the pistol P is depressed, as shown in Figure 3, to depress the plunger 36 and permit the hammer H to be removed from the ear 42 and the barrel B slipped from the sleeve 34 by a user's hand grasping the handle of the pistol.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A gun carriage comprising a mounting bracket, a support pivoted to said bracket for swinging movement, a sleeve mounted on said support for receiving the barrel of a pistol, a hammer seat on the support, means yieldingly retaining the hammer of a pistol in said seat, and means for locking the support against swinging movement.

2. A gun carriage comprising a mounting bracket, a support pivoted to said bracket for swinging movement, a sleeve mounted on said support for receiving the barrel of a pistol, a hammer seat on the support, a spring urged plunger in said sleeve for yieldingly engaging the barrel of a pistol in said seat, and means for locking the support against swinging movement.

3. In a vehicle including a dash panel, a gun carriage comprising a mounting bracket secured to the panel, a support secured to the bracket for swinging movement below and behind the panel, means carried by the support for holding a pistol, and a locking means on the panel engaging the support to hold the latter behind the panel and against swinging movement, said holding means including a sleeve, a spring urged plunger in the sleeve, and a hammer seat in registry with the sleeve, said plunger adapted to engage the barrel of a pistol to urge the hammer of the pistol against the seat.

4. In a vehicle including a dash panel, a gun carriage comprising a mounting bracket secured to and behind the panel, a support secured to the bracket for swinging movement below and behind the panel, means carried by the support for holding a pistol, said support including a rigid arm having an opening, said bracket having a vertical slot receiving the arm when the support is raised behind the panel, and a locking member mounted on the panel and engaging the opening in said arm to lock the support raised, said locking member including a cam surfaced lug and means yieldingly urging the lug outwardly from the locking member, said arm riding against said lug to retract the lug until the opening is in registry with the lug whereupon the lug will enter the opening, and said locking member also including a key operated barrel for retracting the lug.

JOHN W. RILEY.

References Cited in the file of this patent

UNITED STATES PATENTS

| Number | Name | Date |
|---|---|---|
| 1,420,520 | Cervenka | June 30, 1922 |
| 1,421,578 | Schussler | July 4, 1922 |
| 1,557,339 | Sander | Oct. 13, 1925 |
| 2,140,870 | Emery | Dec. 20, 1938 |
| 2,378,545 | Fraser et al. | June 19, 1945 |